United States Patent Office 3,314,914
Patented Apr. 18, 1967

3,314,914
PROCESS FOR THE PRODUCTION OF STABILIZED ACRYLONITRILE POLYMER SOLUTIONS
Carlhans Süling, Leverkusen, Ernst Roos, Cologne-Flittard, and Heino Logemann, Leverkusen, Germany, assignors to Farbenfabriken Bayer Aktiengesellschaft, Leverkusen, Germany, a corporation of Germany
No Drawing. Filed June 22, 1962, Ser. No. 204,626
Claims priority, application Germany, July 7, 1961, F 34,378
4 Claims. (Cl. 260—32.2)

The present invention relates to a process for the production of stabilized acrylonitrile polymer solutions in which special stabilizers are used.

When producing acrylonitrile polymer solutions suitable for the manufacture of formed articles, yellow discolorations always occur because it is necessary to use high concentrations, which require long solution times and generally high solution temperatures.

It is already known to add stabilizers to solutions of acrylonitrile polymers to prevent the yellow discoloration as far as possible.

Thus it is known to add acid compounds as stabilizers. Additives of this kind are mainly intended to eliminate the harmful effect of basic decomposition products of the dimethylformamide which is used as solvent. However, as large scale technical processes are known for producing very pure dimethylformamide, the use of the said stabilizers is very limited. Moreover, it is not possible to obtain really colorless polymer solutions with the aid of these additives.

In this connection it should be pointed out that the yellow discoloration of polyacrylonitrile solutions may be attributed to other chemical reactions, for example due to the yellow discoloration of the polyvinyl chloride solutions. Polyvinyl chloride solutions may be stabilized with compounds which act as hydrogen chloride acceptors. However, such compounds produce a particularly strong yellow discoloration in polyacrylonitrile solution. The discoloration of diolefine polymers and diolefine copolymers, which may be prevented with the usual radical binding agents such as phenol, is produced by a different mechanism from that which produces a brown discoloration in polyacrylonitrile solution. Polyacrylonitrile contains practically no olefinically-unsaturated carbon carbon double bonds. The necessary conditions for cross-linking or for oxidation reactions are not given in polyacrylonitrile polymer solutions.

Owing to the differences in the degradation mechanisms, the stabilizers are specific to the individual polymers. For example, stabilizers which are very effective in polyvinyl chloride solutions are completely ineffective in acrylonitrile polymer solution.

It has already been proposed to use acyl thiosemicarbazides as stabilizers. These stabilizers are not completely satisfactory when the time required for solution is long and when temperatures of about 80° C. are used. The polymer solutions become brown after about 10 to 12 hours.

It is further known that mercaptanes may be added as stabilizers to polyacrylonitrile solutions. However, they are technically difficult to handle owing to their unpleasant odor and their liability to oxidize.

It has now been found that solutions of acrylonitrile polymers having a high proportion of bound acrylonitrile dissolved in organic solvents may be very effectively stabilized against yellow discoloration by the addition of stabilizers if one of the following stabilizers is used:

(I) Thiosemicarbazides of the formula

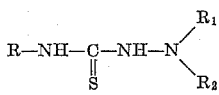

in which R represents an alkyl-, aryl- or aralkyl radical or a hydrogen atom, $R_1$ represents an alkyl-, aryl- or aralkyl radical or a hydrogen atom and $R_2$ represents a hydrogen atom or an acyl radical, but not more than two of the radicals R, $R_1$ and $R_2$ may be hydrogen atoms in one and the same compound;

(II) Sulphonylthiosemicarbazides of the general formula

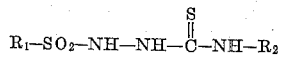

In which $R_1$ represents an aryl radical, a substituted aryl radical or an alkyl radical, and $R_2$ represents a hydrogen atom or an alkyl-, aryl- or heterocyclic radical;

(III) A combination of compounds of the general formula

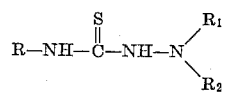

in which R represents an alkyl-, aryl- or aralkyl radical or a hydrogen atom, $R_1$ represents an alkyl-, aryl- or aralkyl radical or a hydrogen atom and $R_2$ represents a hydrogen atom or an acyl radical; and compounds of the general formula

in which $R_3$ and $R_4$ each represents an alkyl-, aryl- or aralkyl radical or togther represent an alkylene bridge or a ring system with 2 free valencies;

(IV) Combinations of (i) acylthiosemicarbazides of the general formula

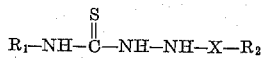

in which X represents >CO or >$SO_2$, $R_1$ represents a hydrogen atom or an alkyl-, aryl-, aralkyl or heterocyclic radical and in which $R_2$ represents an alkyl-, aryl-, or heterocyclic radical and/or (ii) acid anhydrides and/or (iii) complex forming compounds and (V) Thiosemicarbazones of the general formula

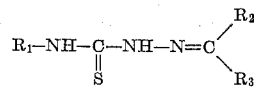

in which $R_1$ represents an alkyl-, aryl- or aralkyl radical or a hydrogen atom, $R_2$ represents an alkyl-, aryl- aralkyl radical or a hydrogen atom and $R_3$ represents an alkyl-, aralkyl or aryl radical and mixtures of said thiosemicarbazones with acid anhydrides and/or complex forming compounds.

Concerning the stabilizers I to IV;

The stabilizers (I) used according to the invention are unambiguously characterized by the formula given above. All these compounds are derivatives of thiosemicarbazide. $R_2$ represents acyl groups in the widest sense of this word. This includes the acetyl group, benzoyl group, propionyl group or heterocyclic acyl radicals, such as the furoyl radical, and acyl radicals such as the carbamide and the thiocarbamide radical.

Particularly effective examples of these stabilizers are acetyl thiosemicarbazide, propionyl thiosemicarbazide, benzoyl thiosemicarbazide and furoyl thiosemicarbazide. A number of other good and effective stabilizers are given in Example 2.

All the stabilizers are sufficiently soluble in the solvents used for the manufacture of the polymer solution. The stabilizers are in the form of solid crystalline powders.

The quantity of stabilizer (I) to be added may vary within wide limits and generally lies between 0.01 to 5%, calculated on the polymer, preferably between 0.05 and 3%.

The sulphonyl thiosemicarbazides (II) are obtained by known processes, for example by reacting thiosemicarbazides with alkyl- or arylsulphonic acid chlorides in the presence of a base. An additional improvement of the effect of the stabilizer may be obtained according to the invention by using the said stabilizers in combination with carboxylic acid anhydrides and/or complex forming compounds.

Examples of suitable carboxylic acid anhydrides are acetic acid anhydride, propionic acid anhydride, maleic acid anhydride, succinic acid anhydride, phthalic acid anhydride, benzoic acid anhydride, mucic acid anhydride and mixed acid anhydrides, such as the mixed anhydride of benzoic acid and acetic acid. Acetic acid anhydride, succinic acid anhydride and phthalic acid anhydride have proved to be particularly satisfactory.

The complex-forming compounds are understood to be compounds capable of reacting with multivalent metals to produce complex compounds, for example salicylic acid and 8-hydroxyquinoline, although complex forming compounds of the ethylene diamine tetracetic acid type are preferred.

The total quantity of stabilizer (II) used may vary within wide limits and depends on the purity of the solvent, the solution temperatures and the solution times. It is preferable to use a combination in which the quantity of acid anhydride is 50 to 5% of the sulphonylthiosemicarbazide and the quantity of added complex forming compound is 0.1 to 30% of the quantity of acid anhydride used.

In the case of the stabilizers (III), the compounds of the first formula are thiosemicarbazides and acylthiosemicarbazides. These compounds are distinguished from all known sulphur-containing stabilizers for acrylonitrile polymer solutions by the fact that they contain, in the hydrazine grouping, a system which can act as reaction partner both with oxidizing agents and with reducing agents. The following are examples of compounds which correspond to the general first formula: Thiosemicarbazide, acetyl thiosemicarbazide and benzoyl thiosemicarbazide. Compounds of the general second formula are carboxylic acid anhydrides. Examples of these are: Acetic acid anhydride, phthalic acid anhydride, benzoic acid anhydride, succinic acid anhydride and maleic acid anhydride.

The stabilizers (III) (first formula) used according to the invention are manufactured by processes which are known per se. When selecting the individual components, it is important to ensure that they are easily soluble in the solvents used for polyacrylonitrile. The quantity of stabilizer used may vary within wide limits and generally lies between 0.01 to 5% calculated on the polymer, preferably between 0.5 to 3%. Particularly effective combinations of stabilizers are obtained if a high proportion of a thiosemicarbazide is combined with a small proportion of a carboxylic acid anhydride. The total quantity of stabilizer used depends on the degree of purity of the solvent used, the duration of the dissolving process and the solution temperature, and in general it depends only to an insignificant extent on the composition of the polymer. The optimum concentrations may easily be determined by preliminary experiment.

In the case of the stabilizers (IV) the acid anhydrides are understood to be carboxylic acid anhydrides. Examples are: Acetic acid anhydride, propionic acid anhydride, maleic acid anhydride, succinic acid anhydride, phthalic acid anhydride, benzoic acid anhydride, mucic acid anhydride and mixed anhydride, for example the mixed anhydride of benzoic acid and acetic acid. Acetic acid anhydride, succinic acid anhydride and phthalic acid anhydride have proved to be particularly satisfactory. Complex forming compounds are again understood to be compounds which react with multivalent metals to form complex compounds, for example salicylic acid or 8-hydroxyquinoline, although complex forming compounds of the ethylene diamine tetracetic acid type are preferred.

The total quantity of stabilizer combinations to be used may vary within wide limits and depends on the purity of the solvent, the solution temperatures and the solution times. It is preferable to use a combination in which the quantity of acid anhydride is 50 to 5% of the acylthiosemicarbazide, and the quantity of complex-forming compound added is 50 to 5% of the quantity of acid anhydride used.

The stabilizers (V) according to the invention are unambiguously characterised by the above formula. All the compounds are thiosemicarbazones. Particularly effective examples of these stabilizers are benzaldehyde thiosemicarbazone and acetophenonethiosemicarbazone.

All the stabilizers are adequately soluble in solvents that may be used for the manufacture of the polymer solution. The stabilizers are solid crystalline powders in which the quantities may be conveniently and accurately measured.

The proportion of polymer in the solution lies between 5 and 35%. The quantity of stabilizer may vary within wide limits and generally lies between 0.01 and 5%, calculated on the polymer, preferably between 0.05 and 4%.

The acrylonitrile polymers may be either acrylonitrile homopolymers or acrylonitrile copolymers, but they always contain a predominant proportion of bound acrylonitrile. As co-components there may be used the usual co-monomers customarily used for the manufacture of such polymers, such as acrylic acid esters, methacrylic acid esters, vinyl acetate, acrylic acid amide, methacrylamide, methyl vinyl ketone, styrene, vinyl pyridine, styrene sulphonic acid, acrylic acid and methacrylic acid. It is preferable to use acrylic acid polymers containing at least 80% of bound polyacrylonitrile.

The usual high polar solvents such as dimethyl formamide, dimethyl acetamide, or ethylene glycol carbonate are used as solvents for the production of the solutions according to the invention.

The production of the polymer solutions according to the invention is generally carried out at temperatures between 10 and 100° C., preferably between 30 and 80° C. The solutions are manufactured in known manner. The amount of polymer in the solution lies between 5 and 35%. The addition of the stabilizer system during the solution process may be effected by adding a highly concentrated stock solution through a dosing apparatus to the solvent for the polymer or to the solution that is to be prepared, in a solution worm or solution tank. Alternatively, the stabilizer combination may be introduced together with the polymer into the solvent. If desired, the stabilizer may be added pure during the solution process. The solutions obtained may be formed into articles either directly or after evacuation or filtration. The stabilized solutions obtained according to the invention are colorless although the usual solution conditions are used, and they may be stored for longer periods, even at high temperatures, without giving rise to any yellow discoloration or formation of yellow particles.

*Example 1*

30 parts by weight of an acrylonitrile copolymer consisting of 95 parts by weight of acrylonitrile and 5 parts by weight of acrylic acid methyl ester are finely powdered together with 0.15 part by weight of thiosemicarbazide and introduced into 100 parts by weight of dimethylformamide at 30° C. Complete solution is obtained by raising the temperature of the solution components to 60° C. for ½ hour. After heating the polymer solution obtained at 130° C., there is only an extremely slight yellow discoloration.

If the same process is carried out without the addition of stabilizer, the polymer solution undergoes a strong yellow discoloration.

*Example 2*

To follow the yellowing process quantitatively with increasing temperature, 5% polymer solutions were used. These solutions have a low viscosity and may easily be measured into measuring flasks.

5% solutions of a copolymer consisting of 95% acrylonitrile and 5% acrylic acid methyl ester in dimethyl formamide are prepared. The stabilizers shown in the following table are added in the quantities indicated in the table to these solutions. The polymer solutions are then heated for ½ hour at 90° C. and the amount of yellow colour is then measured optically. This is followed by a further heat treatment for one hour at 130° C., and the degree of yellowing is again measured optically. The optical measurements are carried out in a Zeiss Elco photometer III at $\lambda = 470 m\mu$. The results are converted to the values obtained in a layer of 5 cm. thickness.

TABLE (1) Thiosemicarbazide $NH_2NH-\overset{S}{\overset{\|}{C}}-NH_2$ (for comparison)

(2) Acetyl thiosemicarbazide $CH_3CO-NHNH-\overset{S}{\overset{\|}{C}}-NH_2$ (3) 1-phenyl-thiosemicarbazide $C_6H_5-NH-\overset{S}{\overset{\|}{C}}-NH-NH_2$ (4) 1-phenyl-dithio-hydrazo-dicarbonamide $C_6H_5-NH-\overset{S}{\overset{\|}{C}}-NH-NH-\overset{S}{\overset{\|}{C}}-NH_2$ (5) 1:6-diphenyl-dithio-hydrazo-dicarbonamide $C_6H_5-NH-\overset{S}{\overset{\|}{C}}-NH-NH-\overset{S}{\overset{\|}{C}}-NH.C_6H_5$

| Stabilizers | Extinction before heat treatment | Extinction after heat treatment for one-half hour at 90° C. | Extinction after heat treatment for one-half hour at 90° C. and 1 hour at 130° C. |
|---|---|---|---|
| Without stabilizer | 0.030 | 0.067 | 0.715 |
| With 2% stabilizer (1) | 0.034 | 0.053 | 0.310 |
| With 2% stabilizer (2) | 0.035 | 0.050 | 0.150 |
| With 1% stabilizer (2) | 0.033 | 0.044 | 0.132 |
| With 0.5% stabilizer (2) | 0.034 | 0.044 | 0.147 |
| With 0.2% stabilizer (2) | 0.034 | 0.046 | 0.229 |
| With 2% stabilizer (3) | 0.024 | 0.045 | 0.223 |
| With 2% stabilizer (5) | 0.020 | 0.040 | 0.170 |
| With 2% stabilizer (6) | 0.036 | 0.050 | 0.193 |

As shown in the table, a sample of polymer without addition of stabilizer of the invention has an extinction of 0.715 after heat treatment. A sample containing 1% of stabilizer 2 as additive has an extinction of 0.132 after the heat treatment. The extinction values are a measure of the degree of yellow discoloration.

*Example 3*

A 5% solution of an acrylonitrile polymer again consisting of 95% acrylonitrile and 5% acrylic acid methyl ester is examined by the same method as that given in Example 2. Owing to the addition of small quantities of a heavy metal during the polymerization, the polymer used in this case is not so stable to heat as the polymer used in the above investigations. The initial solution containing no stabilizer therefore shows greater yellow discoloration in the heat treatment. The measurements given in the table below show that the stabilizers according to the invention are highly effective even for polymers of this kind.

TABLE

| | After preparing the solution | After heating for one-half hour at 90° C. | After further heating for 1 hour at 130° C. |
|---|---|---|---|
| Without additive | 0.028 | 0.181 | 1.30 |
| With 2% stabilizer (2) | 0.046 | 0.105 | 0.550 |
| With 0.5% stabilizer (2) | 0.042 | 0.105 | 0.650 |

*Example 3a*

A 5% solution of an acrylonitrile polymer consisting of 95% acrylonitrile and 5% acrylic acid methyl ester is prepared in the same way as described in Example 2. One part by weight (calculated on the dissolved polymer) of formyl thiosemicarbazide is added to the solution. The test method after heat treatment is the same as described in Example 2 and the test results are as follows:

Extinction of the sample prior to heat treatment:

0.081

Extinction of the sample stabilized with formyl thiosemicarbazide prior to heat treatment:

0.082

Extinction after a heat treatment of ½ hour at 90° C.:
  (1) Sample without stabilizer 0.094
  (2) Sample with stabilizer 0.093
Extinction after heat treatment for ½ hour at 90° C. and 1 hour at 130° C.:
  (1) Sample without stabilizer 0.400
  (2) Sample with stabilizer 0.145

The extinction values are determined as described in Example 2.

*Example 4*

5% solutions of a copolymer consisting of 95% acrylonitrile and 5% acrylic acid methyl ester are prepared in dimethylformamide with and without the additives given in the table. The extinction values for the solutions are determined in cups having layer thickness 5 cm., immediately after preparation of the solution and then after heat treatment for ½ hour at 90° C. and then after a further heat treatment for one hour at 130° C. The test is carried out in a Zeiss Elco Photometer III at 470 μ.

| | Extinction of the unheated solution | Extinction after heat treatment for one-half hour at 90° | Extinction after heat treatment for one-half hour at 90° and 1 hour at 130° |
|---|---|---|---|
| Polymer without stabilizer | 0.020 | 0.054 | 0.390 |
| Polymer + 1% benzene sulphonyl thiosemicarbazide | 0.024 | 0.045 | 0.210 |
| Polymer with 1% benzene sulphonyl thiosemicarbazide + 0.2% succinic acid anhydride | 0.024 | 0.044 | 0.160 |
| Polymer with ½% benzene sulphonyl thiosemicarbazide | 0.023 | 0.045 | 0.195 |

The table shows that the addition of benzene sulphonyl thiosemicarbazide to dimethyl formamide solutions of polyacrylonitrile copolymer gives a marked protection against yellow discoloration in the heat treatment.

*Example 5*

5% solutions of a copolymer of the same composition as in Example 1 dissolved in dimethylformamide are subjected to heat treatment as described in Example 1. The solutions contained the additives listed under 1 to 6.

Sample 1: without additive
Sample 2: 0.3% benzene sulphonyl thiosemicarbazide
Sample 3: 0.6% benzene sulphonyl thiosemicarbazide
Sample 4: 0.6% benzene sulphonyl thiosemicarbazide and 0.1% succinic acid anhydride
Sample 5: 0.6% benzene sulphonyl thiosemicarbazide, 0.2% succinic acid anhydride and 0.02% nitrilo triacetic acid as the sodium salt.
Sample 6: 0.6% benzene sulphonyl thiosemicarbazide, 0.1% succinic acid anhydride and 0.02% nitrilo triacetic acid as the sodium salt.

Extinction of the unheated solution:

Sample 1: 0.023; Sample 2: 0.022; Sample 3: 0.021; Sample 4: 0.024; Sample 5: 0.023; Sample 6: 0.021.

Extinction after heat treatment for ½ hour at 90°;

Sample 1: 0.074; Sample 2: 0.046; Sample 3: 0.044; Sample 4: 0.048; Sample 5: 0.045; Sample 6: 0.043.

Extinction after heat treatment for ½ hour at 90° and one hour at 130°:

Sample 1: 0.463; Sample 2: 0.220; Sample 3: 0.213; Sample 4: 0.173; Sample 5: 0.160; Sample 6: 0.143.

*Example 6*

A 20% solution of a copolymer consisting of 95 parts of acrylonitrile and 5 parts of acrylic acid methyl ester in dimethyl formamide is prepared by heating in an atmosphere of nitrogen for 2 hours at 75° with and without the stabilizers given in the table. The solutions are then heated for 16 hours at 80° and then measured in an Elco Photometer III at $\lambda=470$ m$\mu$ in a layer of thickness $d=1$ cm.

| | Extinction |
|---|---|
| Polymer without stabilizer | 0.388 |
| Polymer with 1% benzene sulphonyl thiosemicarbazide | 0.271 |
| Polymer with 1% benzene sulphonyl thiosemicarbazide + 0.1% phthalic acid anhydride | 0.246 |
| Polymer with 0.5% benzene sulphonyl thiosemicarbazide +0.1% phthalic acid anhydride | 0.243 |
| Polymer with 0.25% benzene sulphonyl thiosemicarbazide +0.1% phthalic acid anhydride | 0.235 |
| Polymer with 1% benzene sulphonyl thiosemicarbazide + 0.1% phthalic acid anhydride ethylene diamine tetracetic acid | 0.220 |
| Polymer with 0.5% benzene sulphonyl thiosemicarbazide +0.1% phthalic acid anhydride +0.05% ethylene diamine tetracetic acid | 0.215 |
| Polymer with 0.25% benzene sulphonyl thiosemicarbazide +0.1% phthalic acid anhydride +0.05% ethylene diamine tetracetic acid | 0.169 |
| Do | 0.181 |
| Polymer with 0.25% benzene sulphonyl thiosemicarbazide + 0.25% phthalic acid anhydride + 0.05% ethylene diamine tetracetic acid | 0.176 |

*Example 7*

30 parts by weight of weight of acrylonitrile polymer of 95 parts by weight acrylonitrile and 5 parts by weight of acrylic acid methyl ester are dissolved, together with 0.5 part by weight of acetyl thiosemicarbazide and 0.2 part by weight of phthalic acid anhydride, in 100 parts by weight of dimethylformamide. After heating the solution for one hour at 130° C., there is only a very slight yellow discoloration. A solution prepared without the addition of the stabilizer mixture shows considerable yellow discoloration after the same heat treatment.

*Example 8*

5% polymer solutions are prepared for carrying out a quantitative estimation of the discoloration process with increased temperatures. These polymer solutions are easy to handle owing to their low viscostiy.

5% solutions of a copolymer consisting of 95% of acrylonitrile and 5% of acrylic acid methyl ester in dimethylformamide are prepared. The stabilizer combinations shown in the table below are added in the given quantities to these solutions. The polymer solutions are then heated for ½ hour at 90° C. and the yellow discoloration is then measured optically. This is followed by a further heat treatment for one hour at 130° C. and the degree of yellow discoloration is again measured optically. The optical measurements are carried out in a Zeiss Elco Photometer III at $\lambda=470$ m$\mu$. The results are converted to the values corresponding to a layer of 5 cm. thickness. The extinction values determined are a measure of the degree of yellow discoloration.

TABLE

| | Extinction of unheated solution | Extinction after heat treatment for one-half hour at 90° C. | Extinction after heat treatment for one-half hour at 90° C. and 1 hour at 130° C. |
|---|---|---|---|
| Polymer without stabilizer | 0.032 | 0.076 | 0.690 |
| 1% phthalic acid anhydride | 0.026 | 0.093 | 0.375 |
| 0.5% phthalic acid anhydride | 0.026 | 0.044 | 0.600 |
| 0.2% phthalic acid anhydride | 0.030 | 0.046 | 0.778 |
| 0.2% acetyl thiosemicarbazide = stabilizer 2 | 0.034 | 0.046 | 0.229 |
| 0.5% acetyl thiosemicarbazide = stabilizer 2 | 0.034 | 0.044 | 0.147 |
| 1% acetyl thiosemicarbazide = stabilizer 2 | 0.033 | 0.044 | 0.132 |
| 1% stabilizer 2 + 0.5% phthalic acid | 0.032 | 0.044 | 0.096 |
| 1% stabilizer 2 + 0.2% phthalic acid anhydride | 0.032 | 0.046 | 0.104 |
| 1% stabilizer 2 + 0.075% phthalic acid anhydride | 0.035 | 0.054 | 0.123 |
| 0.5% stabilizer 2 + 0.2% phthalic acid | 0.033 | 0.044 | 0.107 |
| 0.5% stabilizer 2 + 0.0075% phthalic acid anhydride | 0.031 | 0.048 | 0.116 |
| 0.2% stabilizer 2 + 0.1% phthalic acid anhydride | 0.033 | 0.042 | 0.209 |
| 0.2% stabilizer 2 + 0.05% phthalic acid anhydride | 0.028 | 0.046 | 0.262 |

It is seen from the table that phthalic acid anhydride itself does not act as stabilizer until it is used in quantities of over 0.5%. The acetyl thiosemicarbazide, referred to as stabilizer 2, acts as stabilizer at concentrations below 0.5%. If, however, 0.2% phthalic acid anhydride is combined with 0.5% stabilizer 2 (see line 5 of the table), then the effect of stabilizer 2 is considerably enhanced by the addition of phthalic acid anhydride.

*Example 9*

A 20% solution of a copolymer consisting of 95 parts of acrylonitrile and 5 parts of acrylic acid methyl ester in dimethyl formamide is heated in a nitrogen atmosphere for 16 hours at 80°. The extinction is then measured in a Zeiss Elco Photometer III at $\lambda=470$ m$\mu$ at a layer thickness of 1 cm. The following values are obtained when the given additives are added to the solvent before addition of the polymer.

| | Extinction |
|---|---|
| Without additive | 0.205 |
| With 1% acetylthiosemicarbazide | 0.161 |
| With 1% acetyl thiosemicarbazide + 0.05% ethylene diamine tetracetic acid | 0.152 |
| With 1% acetyl thiosemicarbazide + 0.2% succinic acid anhydride | 0.138 |
| With 1% acetyl thiosemicarbazide + 0.2% succinic acid anhydride + 0.05% ethylene diamine tetracetic acid | 0.122 |
| With 1% acetyl thiosemicarbazide + 0.2% succinic acid anhydride + 0.017% ethylene diamine tetracetic acid | 0.127 |
| With 1% acetyl thiosemicarbazide + 0.5% acetic acid anhydride | 0.150 |
| With 1% acetyl thiosemicarbazide + 0.5% acetic acid anhydride + 0.05% ethylene diamine tetracetic acid | 0.110 |
| With 1% acetyl thiosemicarbazide + 0.5% acetic acid anhydride + 0.017% ethylene diamine tetracetic acid | 0.138 |

Example 10

A 5% solution of a copolymer of 95 parts of acrylonitrile and 5 parts of acrylic acid methyl ester in dimethyl formamide is heated, with and without addition of stabilizer, for ½ hour at 90° C. and then for a further hour at 130° C. The following extinction values are obtained with a layer thickness of 5 cm. at λ=470 mμ.

|  | Not heated | One-half hour, 90° | 1 hour, 130° |
|---|---|---|---|
| Without addition | 0.041 | 0.125 | 0.993 |
| With 1% acetylthiosemicarbazide | 0.044 | 0.097 | 0.563 |
| With 1% acetylthiosemicarbazide + 0.2% succinic acid anhydride | 0.043 | 0.098 | 0.438 |
| With 1% acetylthiosemicarbazide + 0.2% succinic acid anhydride + 0.02% ethylene diamine tetracetic acid | 0.045 | 0.091 | 0.345 |
| With 1% acetylthiosemicarbazide + 1% acetic acid anhydride | 0.044 | 0.097 | 0.395 |
| With 1% acetylthiosemicarbazide + 1% acetic acid anhydride + 0.02% ethylene diamene tetracetic acid | 0.045 | 0.090 | 0.320 |
| With 1% acetylthiosemicarbazide + 0.2% toluene sulphonic acid | 0.040 | 0.086 | 0.468 |
| With 1% acetylthiosemicarbazide + 0.2% toluene sulphonic acid + 0.02% ethylene diamine tetracetic acid | 0.044 | 0.091 | 0.390 |
| With 1% acetylthiosemicarbazide + 0.02% ethylene diamine tetracetic acid | 0.043 | 0.086 | 0.498 |

Example 11

A 5% solution of a similar copolymer composed of 95 parts of acrylonitrile and 5 parts of acrylic acid methyl ester in dimethyl formamide is prepared as in Example 2. The following extinction values are obtained with a layer thickness of 5 cm. at λ=470 mμ:

|  | Not heated | ½ hour, 90° C. | 1 hour, 130° C. |
|---|---|---|---|
| Without addition | 0.055 | 0.150 | 1.140 |
| With 1% acetyl thiosemicarbazide+0.2% phthalic acid anhydride | 0.066 | 0.120 | 0.523 |
| With 1% acetyl thiosemicarbazide+0.2% phthalic acid anhydride+0.04% ethylene diamine tetracetic acid | 0.067 | 0.118 | 0.405 |
| With 1% acetyl thiosemicarbazide+0.2% phthalic acid anhydride+0.01% ethylene diamine tetracetic acid | 0.065 | 0.116 | 0.423 |

Example 12

30 parts by weight of an acrylonitrile copolymer composed of 95 parts by weight of bound acrylonitrile and 5 parts by weight of bound acrylic acid methyl ester are finely powdered with 0.45% by weight of acetone thiosemicarbazone and introduced into 100 parts by weight of dimethylformamide at 30° C. Complete solution is obtained by raising the temperature of the mixture to 70° C. within one hour. After heating the resulting polymer solution at 130° C., there is only very slight yellow discoloration.

When this process is repeated without the addition of stabilizer a polymer solution with marked yellow discoloration is obtained.

Example 13

5% polymer solutions are used for quantitative determination of the yellowing process with increasing temperatures. These polymer solutions have a low viscosity and may easily be poured into measuring flasks without producing air bubbles.

5% solutions of a copolymer composed of 95% acrylonitrile and 5% acrylic acid methyl ester are prepared in dimethyl formamide. The stabilizers shown in the table below are added in the given quantities to these solutions. The polymer solutions are then heated for ½ hour at 90° C. and the yellow discoloration is measured optically. This is followed by a further heat treatment for one hour at 130° C. The degree of yellow discoloration is then again measured optically. The optical determinations are carried out in a Zeiss Elco Photometer III at λ=470 mμ. The results are converted to the values for a layer of 5 cm. thickness.

TABLE (1) Acetone thiosemicarbazone
(2) Acetophenone thiosemicarbazone
(3) Benzaldehyde thiosemicarbazone
(4) Cyclohexanone thiosemicarbazone
(5) Salicylic aldehyde thiosemicarbazone
(6) Cinnamic aldehyde thiosemicarbazone

| Stabilizers | Extinction before heat treatment | Extinction after heat treatment for one-half hour at 90° C. | Extinction after heat treatment for one-half hour at 90° and one hour at 130° C. |
|---|---|---|---|
| Without stabilizer | 0.031 | 0.076 | 0.650 |
| 2% stabilizer (1) | 0.041 | 0.054 | 0.308 |
| 2% stabilizer (2) | 0.033 | 0.037 | 0.163 |
| 2% stabilizer (3) | 0.033 | 0.035 | 0.150 |
| 2% stabilizer (4) | 0.040 | 0.045 | 0.438 |
| 2% stabilizer (5) | 0.074 | 0.090 | 0.290 |
| 2% stabilizer (6) | 0.143 | 0.205 | 0.562 |

As shown in the table, a sample of polymer without addition of the compounds according to the invention has an extinction of 0.650 after heat treatment. A sample to which 2% of stabilizer 4 has been added has an extinction of 0.150 after heat treatment. The extinctions are a measure of the degree of yellowing.

What is claimed is:

1. In the process for the production of a solution of an acrylonitrile polymer containing at least 80% of polymerized acrylonitrile the balance, if any, comprising at least one member selected from the group consisting of acrylates, methacrylates, vinyl acetate, acrylamide, methacrylamide, methyl vinyl ketone, styrene, vinyl pyridine, styrene sulphonic acid, acrylic acid, and methacrylic acid which is stabilized against discoloration upon standing and heating, which process comprises dissolving such polymer in an organic solvent selected from the group consisting of dimethyl formamide, dimethyl acetamide, and ethylene glycol carbonate, and admixing with said solution 0.01 to 5% by weight of a stabilizer selected from the group consisting of (I) a thiosemicarbazide selected from the group consisting of acetyl thiosemicarbazide, propionyl thiosemicarbazide, benzoyl thiosemicarbazide, furoyl thiosemicarbazide, and 1-phenyl thiosemicarbazide, (II) benzene sulphonylthiosemicarbazide, (III) a combination of said thiosemicarbazide and a carboxylic acid anhydride selected from the group consisting of acetic anhydride, propionic anhydride, maleic anhydride, succinic anhydride, phthalic anhydride, benzoic anhydride, mucic anhydride, and benzoic-acetic mixed anhydride, (IV) a combination of benzenesulphonylthiosemicarbazide and a carboxylic acid anhydride as defined in (III) and a complex forming compound selected from the group consisting of salicylic acid, 8-hydroxy quinoline and ethylene diamine tetraacetic acid, and (V) a member selected from the group consisting of a thiosemicarbazone selected from the group consisting of benzaldehyde thiosemicarbazone and a mixture of said thiosemicarbazone, and a member selected from the group consisting of a carboxylic acid anhydride as defined in (III) and a complex-forming compound as defined in (IV).

2. Process according to claim 1 wherein said acrylonitrile polymer comprises a copolymer of at least about 80% acrylonitrile and at least one member selected from the group consisting of acrylates, methacrylates, vinyl acetate, acrylamide, methacrylamide, methyl vinyl ketone, styrene, vinyl pyridine, styrene sulphonic acid, acrylic acid, and methacrylic acid.

3. Process according to claim 1 wherein 5–35 weight percent of said polymer is dissolved in said solvent.

4. A stable solution of an acrylonitrile polymer containing at least 80% of polymerized acrylonitrile comprising the product produced according to claim 1.

References Cited by the Examiner

UNITED STATES PATENTS

| | | | |
|---|---|---|---|
| 2,353,690 | 7/1944 | Clarkson et al. | 260—45.9 |
| 2,396,156 | 3/1946 | Clarkson | 252—402 |
| 2,614,090 | 10/1952 | Averill | 260—45.85 |
| 2,661,347 | 12/1953 | Wesp et al. | 260—45.85 |
| 2,681,329 | 6/1954 | Stanton et al. | 260—45.9 |
| 2,775,574 | 12/1956 | Slocombe et al. | 260—45.80 |
| 2,878,208 | 3/1959 | Holmes | 260—45.85 |
| 3,154,511 | 10/1964 | Logemann et al. | 260—45.9 |

LEON J. BERCOVITZ, *Primary Examiner.*

H. E. TAYLOR, JR., *Assistant Examiner.*